(12) United States Patent
Nishiyama et al.

(10) Patent No.: US 11,407,162 B2
(45) Date of Patent: Aug. 9, 2022

(54) PLASTIC BOTTLE PREFORM AND METHOD FOR PRODUCTION THEREOF

(71) Applicant: Suntory Holdings Limited, Osaka (JP)

(72) Inventors: Masanori Nishiyama, Tokyo (JP); Ichiro Tomari, Tokyo (JP); Ryo Yamane, Kawasaki (JP); Hideyuki Suzuki, Tokyo (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 17/053,960

(22) PCT Filed: May 10, 2019

(86) PCT No.: PCT/JP2019/018809
§ 371 (c)(1),
(2) Date: Nov. 9, 2020

(87) PCT Pub. No.: WO2019/216429
PCT Pub. Date: Nov. 14, 2019

(65) Prior Publication Data
US 2021/0237329 A1    Aug. 5, 2021

(30) Foreign Application Priority Data

May 10, 2018    (JP) .............................. JP2018-091342

(51) Int. Cl.
*B65D 23/08*    (2006.01)
*B29C 49/06*    (2006.01)
(Continued)

(52) U.S. Cl.
CPC .............. *B29C 49/06* (2013.01); *B29C 49/22* (2013.01); *B29C 2949/302* (2022.05);
(Continued)

(58) Field of Classification Search
CPC ......... B29C 49/22; B29C 49/02; B29C 49/06; B29C 2049/024; B05D 7/02;
(Continued)

(56) References Cited

U.S. PATENT DOCUMENTS 4,534,930 A * 8/1985 Nohara ............... B29C 45/1684
264/513
2009/0220717 A1    9/2009 Wilczak et al.
(Continued)

FOREIGN PATENT DOCUMENTS

| CN | 101365573 A | 2/2009 |
|----|-------------|--------|
| JP | 59-95120 A  | 6/1984 |

(Continued)

OTHER PUBLICATIONS

International Search Report dated Aug. 13, 2019, issued in Application No. PCT/JP2019/018809, with English translation (5 pages).

*Primary Examiner* — Monica A Huson
(74) *Attorney, Agent, or Firm* — WHDA, LLP

(57) ABSTRACT

Provided is a PET bottle preform in which delamination is suppressed and a method for the production of the preform.
(Continued)

An anchor layer containing a polyester-based urethane resin is formed on an outer surface of the preform.

13 Claims, 1 Drawing Sheet

(51) Int. Cl.
  *B29C 49/22* (2006.01)
  *B29K 67/00* (2006.01)
  *B29L 31/00* (2006.01)

(52) U.S. Cl.
  CPC .. *B29C 2949/3016* (2022.05); *B29K 2067/00* (2013.01); *B29L 2031/7158* (2013.01); *B65D 23/08* (2013.01)

(58) Field of Classification Search
  CPC ............ B05D 2701/10; B05D 2201/02; B05D 2254/02; B05D 3/144; B05D 1/18; B05D 7/586; B29B 11/14; B29B 2911/1408; B29B 2911/14133; B29B 2911/14093; B29B 2911/14273; B65D 23/0821; B65D 23/08; B29L 2031/7158; B29K 2067/00
  See application file for complete search history.

(56) References Cited

U.S. PATENT DOCUMENTS

| | | |
|---|---|---|
| 2010/0180979 A1 | 7/2010 | Mitadera et al. |
| 2012/0306126 A1 | 12/2012 | Fuss et al. |
| 2018/0264517 A1 | 9/2018 | Tomari et al. |

FOREIGN PATENT DOCUMENTS

| | | |
|---|---|---|
| JP | 59-184627 A | 10/1984 |
| JP | 50-201909 A | 10/1985 |
| JP | 2012-250771 A | 12/2012 |
| JP | 2014-151632 A | 8/2014 |
| JP | 2014151631 A | 8/2014 |
| JP | 2015-145111 A | 8/2015 |
| JP | 2017-64640 A | 4/2017 |
| JP | 2017-65149 A | 4/2017 |
| KR | 2010-0031609 A | 3/2010 |
| WO | 03/037969 A1 | 5/2003 |

* cited by examiner

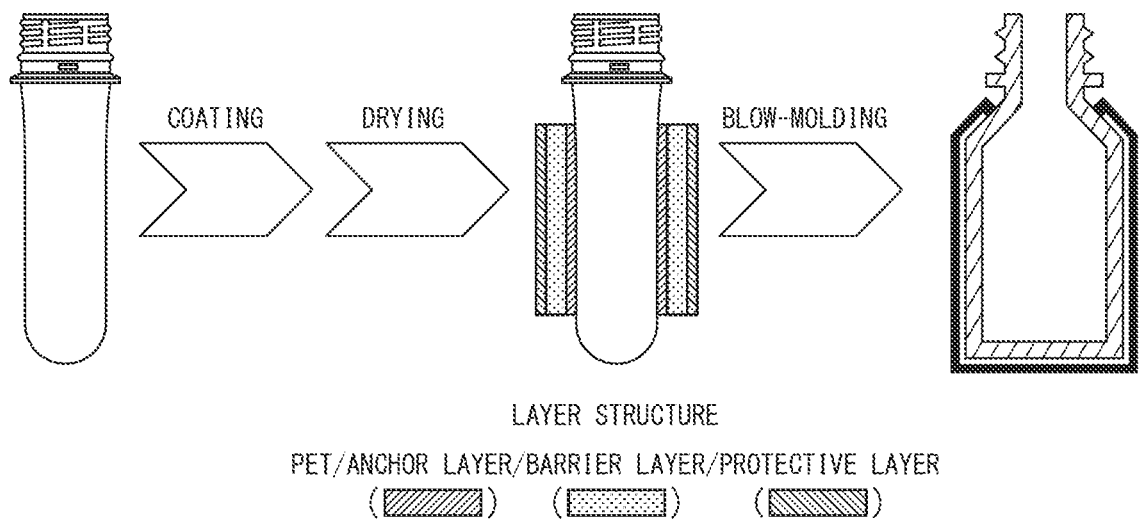

PLASTIC BOTTLE PREFORM AND METHOD FOR PRODUCTION THEREOF

FIELD

The present invention relates to a preform for a plastic bottle in which delamination is suppressed and a method for the production thereof.

BACKGROUND

Currently, polyurethane terephthalate plastic containers (hereinafter also referred to as PET bottles) are widely used for beverages and foods (hereinafter referred to as beverages, etc.), and PET bottles are supplied to bottlers in the form of preforms and are produced by blow-molding.

It is publicly known that a barrier coating is applied to the surface of such a PET bottle to reduce the permeation of gas, particularly oxygen and carbon dioxide, into and out of the container, thereby improving the shelf life of beverages, etc., inside the bottle.

For example, Patent Literature 1 below discloses the use of polyvinyl alcohol (hereinafter abbreviated as PVA) as the gas barrier on a PET bottle, and an additional topcoat containing polyvinyl butyral (hereinafter abbreviated as PVB) is used to improve the water resistance of the barrier coating. Such a multilayer coating exhibits good barrier performance against oxygen and carbon dioxide, scratch resistance, and is water-soluble, whereby the topcoat can be recycled after being mechanically destroyed.

PET bottles used for soft drinks are generally produced from so-called "preforms" by injection stretch blow-molding. In general, in such a blowing method, the preform expands to more than ten times its original volume, resulting in a significantly thinner coating layered on the surface of the preform. Thus, the mechanical and chemical stability of the barrier coating to be ultimately obtained is important.

Thus, it is necessary that, prior to application of the barrier coating, the surface of the preform be chemically or physically pretreated, and pretreatment of the substrate by means of plasma, corona discharge, electron beam, flame, chlorine, fluorine, or chemical etching prior to barrier coating is known.

Furthermore, consumers and manufacturers want to extend the shelf life of beverages, etc., filled in PET bottles without changing the thickness or composition of the PET bottles.

In consideration of such situation of the prior art, Patent Literature 2 below proposes forming a mechanically and chemically stable barrier coating which can withstand blow-molding on the surface of a preform by coating the surface of PET and polypropylene (hereinafter referred to as PP) containers with PVB, PVA, and PVB in this order.

Further, Patent Literature 3 below proposes forming a PVA coating on the tubular body of a preform while rotating the tubular body horizontally, and subsequently forming a PVB coating on the tubular body, and Patent Literature 4 below proposes laminating a gas barrier coating resin laminate, in which layers composed of a predetermined polyvinyl acetal resin are laminated, on a PET bottle.

However, in preform coating technologies, when the contents of a bottle are carbonated, since a force is exerted by the released carbon dioxide gas in the contained liquid due to aging, the problem of peeling (delamination) of the coating film (barrier/topcoat) on the outer surface of the bottle remains.

CITATION LIST

Patent Literature

[PTL 1] WO 03/037969
[PTL 2] Japanese Unexamined Patent Publication (Kokai) No. 2012-250771
[PTL 3] Japanese Unexamined Patent Publication (Kokai) No. 2014-151632
[PTL 4] Japanese Unexamined Patent Publication (Kokai) No. 2014-151631
[PTL 5] Japanese Unexamined Patent Publication (Kokai) No. 2017-65149
[PTL 6] Japanese Unexamined Patent Publication (Kokai) No. 2017-64640

SUMMARY

Technical Problem

The object of the present invention is to provide a preform for a PET bottle in which delamination is suppressed and a method for the production of the preform.

Solution to Problem

As a result of rigorous investigation to solve such problems, the present inventors have discovered that by inserting a polyester-based urethane resin as an anchor coating agent between the outer surface of the preform and the barrier layer, the occurrence of delamination can be significantly suppressed, and have completed the present invention.

Specifically, the present invention is as described below.

[1] A preform for a plastic bottle comprising a mouth serving as an opening of the plastic bottle, a cylindrical body, and a bottom enclosing the cylindrical body, wherein the preform has a coating film in which an anchor layer containing a polyester-based urethane resin is formed on an outer surface of the preform.

[2] The preform according to 1, wherein a barrier layer containing polyvinyl alcohol (PVA) is formed on the anchor layer.

[3] The preform according to 2, wherein a protective layer containing polyvinyl butyral (PVB) is formed on the barrier layer.

[4] The preform according to any one of 1 to 3, wherein the polyester-based urethane resin has a glass transition temperature (Tg) of approximately 65° C. to less than approximately 90° C.

[5] The preform according to any one of 1 to 4, wherein the polyester-based urethane resin has a glass transition temperature (Tg) of approximately 80° C. to approximately 85° C.

[6] A plastic bottle comprising a mouth serving as an opening of the plastic bottle, a cylindrical body, and a bottom enclosing the cylindrical body, wherein the plastic bottle has a coating film in which an anchor layer containing a polyester-based urethane resin is formed on an outer surface of the preform.

[7] The plastic bottle according to 6, wherein a barrier layer containing polyvinyl alcohol (PVA) is formed on the anchor layer.

[8] The plastic bottle according to 7, wherein a protective layer containing polyvinyl butyral (PVB) is formed on the barrier layer.

[9] The plastic bottle according to any one of 6 to 8, wherein the polyester-based urethane resin has a glass transition temperature (Tg) of approximately 65° C. to less than approximately 90° C.

[10] The plastic bottle according to any one of 6 to 9, wherein the polyester-based urethane resin has a glass transition temperature (Tg) of approximately 80° C. to approximately 85° C.

[11] A method for the production of a preform for a plastic bottle, the method comprising the steps of:

preparing a preform comprising a mouth serving as an opening of the plastic bottle, a cylindrical body, and a bottom enclosing the cylindrical body, and coating an outer surface of the preform with an anchor coating agent containing a polyester-based urethane resin and drying to form an anchor layer.

[12] The method according to 11, further comprising the step of coating the anchor layer with a polyvinyl alcohol (PVA) solution and drying to form a barrier layer.

[13] The method according to 12, further comprising the step of coating the barrier layer with a polyvinyl butyral (PVB) solution and drying to form a protective layer.

[14] The method according to any one of 11 to 13, wherein the polyester-based urethane resin has a glass transition temperature (Tg) of approximately 65° C. to less than approximately 90° C.

[15] The method according to any one of 11 to 14, wherein the polyester-based urethane resin has a glass transition temperature (Tg) of approximately 80° C. to approximately 85° C.

[16] A method for the production of a plastic bottle, comprising a step of blow-molding a preform for a plastic bottle produced by the method according to any one of 11 to 15.

[17] A preform for a plastic bottle produced by the method according to any one of 11 to 15.

[18] A plastic bottle produced by the method according to 16.

Advantageous Effects of Invention

According to the present invention, there is provided a preform for a plastic bottle in which the occurrence of delamination is suppressed and a method for the production of the preform.

BRIEF DESCRIPTION OF DRAWINGS

FIG. 1 is a schematic view of a method for the production of a plastic bottle according to the present invention.

DESCRIPTION OF EMBODIMENTS

As used herein, the phrase "plastic bottle" encompasses polyethylene terephthalate (PET), polypropylene (PP), and polyethylene (PE) bottles, and is not limited to PET bottles.

A first embodiment of the present invention provides a preform for a plastic bottle comprising a mouth serving as an opening of the plastic bottle, a cylindrical body, and a bottom enclosing the cylindrical body, wherein the preform has a coating film in which an anchor layer containing a polyester-based urethane resin is formed on an outer surface of the preform.

In the preform according to the present invention, a barrier layer containing polyvinyl alcohol (PVA) is formed on the anchor layer, and a protective layer containing polyvinyl butyral (PVB) is preferably further formed on the barrier layer.

Polyester-based urethane resins are produced by reacting a polyester polyol and a polyisocyanate in the presence of a low molecular weight diol, diamene, etc., as necessary. The polyester-based urethane resin used in the present invention typically has a glass transition temperature (Tg) of approximately 65° C. to less than approximately 90° C. and preferably has a glass transition temperature (Tg) of approximately 80° C. to approximately 85° C. The polyester-based urethane resin used in the present invention is preferably water-dispersible. Examples of such polyester-based urethane resins include Takelac™ W-5030 (Mitsui Chemicals, Inc.), WS-5000 (Mitsui Chemicals, Inc.), and WS-5984 (Mitsui Chemicals, Inc.).

PVA can significantly reduce the gas permeability of the substrate (particularly $O_2$ and $CO_2$), thereby improving the shelf life of the contained food or beverage such as soft drink or beer. However, the applications of coatings composed of PVA alone are limited due to the hygroscopicity thereof. Thus, polyvinyl acetals, for example, PVB, have been found to be suitable as the top-coating (protective layer) for the PVA layer (barrier layer) and have been used. PVA polymers and PVB polymers have similar polymer backbone chains, as illustrated in the following chemical formulas:

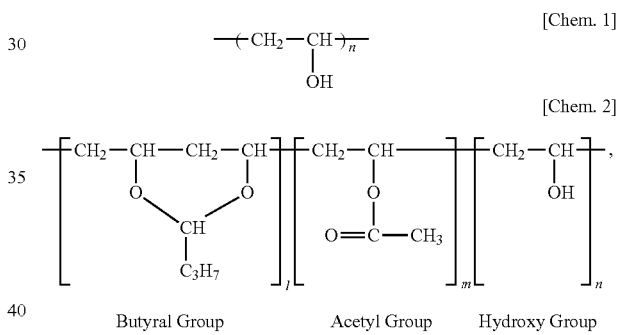

Butyral Group    Acetyl Group    Hydroxy Group and are compatible in a wide range of mixtures.

Another embodiment of the present invention provides a method for the production of a preform for a plastic bottle, the method comprising the steps of preparing a preform comprising a mouth serving as an opening of the plastic bottle, a cylindrical body, and a bottom enclosing the cylindrical body, and coating an outer surface of the preform with an anchor coating agent containing a polyester-based urethane resin and drying to form an anchor layer.

The method according to present invention preferably further includes the step of coating the anchor layer with a PVA solution and drying to form a barrier layer and the step of coating the barrier layer with a PVB solution and drying to form a protective layer.

The above method is a method for producing a preform according to the present invention, in which the above-mentioned anchor coating agent, PVA, and PVB are used.

Examples of solvents which can be used for the preparation of the PVA solution include water, methanol, ethanol, IPA, MEK, acetone, ethylene glycol, triethylene glycol, glycerin, acetamide, dimethylamide, dimethyl acetamide, dimethyl sulfoxide, cyclohexanone, tetrahydrofuran, DMSO, pyridine, and/or combinations thereof.

Examples of solvents which can be used for the preparation of the PVB solution include methanol, ethanol, n-propanol, IPA, n-butanol, octanol, methyl cellosolve, ethyl cellosolve, butyl cellosolve, acetone, MEK, MIBK, cyclohexanone, isophorone, N,N-dimethylacetamide, N,N-dimethylformamide, N-methyl-2-pyrrolidone, methyl acetate, ethyl acetate, isopropyl acetate, n-butyl acetate, ethyl ether, dioxane, tetrahydrofuran, toluene, xylene, pyridine, dimethyl sulfoxide, acetic acid, terpineol, butyl carbitol, butyl carbitol acetate, and/or combinations thereof.

The concentration of PVA in the solution is preferably approximately 1 to approximately 30 wt % and the concentration of PVB in the solution is preferably approximately 0.1 to approximately 50 wt %.

For the coating in each of the above steps, in addition to, for example, coating methods which are well known in the art such as dipping (immersion) methods, blow methods, spray methods, coater methods, and transfer methods, a dispenser coating method using a slot-die can be used.

Slot-die coating methods are disclosed in detail in Patent Literature 5 and 6, which are achieved by holding a preform horizontally, rotating the preform about an axis, and spraying the coating solution in a planar manner from a dispenser slot toward the rotating preform. Though variations in the film thickness of the coating formed on the preform can be reduced and the occurrence of bubbles in the coating liquid applied to the preform can be suppressed by using such a coating method, when the anchor layer is coated with a barrier material such as PVA, there is a problem in that uniform application cannot be achieved. However, such coating defects can be prevented by adding a leveling agent to the barrier material. The leveling agent which can be used in the present invention is preferably a siloxane, a silicone resin, or a fluororesin. Examples of such leveling agents include DYNOL-980 (Air Products), KP-104 and KP-110 (Shinetsu Silicone), and Megafak F-477 and RS-72-K (DIC Corporation).

In the method for the production of a preform according to the present invention, prior to coating with an anchor coating agent, the preform surface is preferably plasma, corona, or electron beam treated. Due to such pretreatment, adhesion of the anchor layer to the substrate can be strengthened. However, such pretreatment is an optional additional step and in the present invention, in most cases, it is possible to produce a preform having a mechanically stable coating which can be stretch blow-molded without the occurrence of cracks or delamination without pretreatment.

The drying means in each of the above steps is not particularly limited as long as each layer is formed, but it is preferably carried out with a heater and blowing air (ambient temperature or hot air). In order to shorten the heating and drying time of the coating solution, it is effective to heat from the inside of the film by selecting a heat source having a heating wavelength suitable for the absorption wavelength of water, which is the solvent, and the hydroxyl group. From this viewpoint, it is preferable to use a carbon heater which generates near-infrared to mid-infrared rays. Furthermore, in order to efficiently remove the evaporated water without cooling the film, a far-infrared heater, blowing air (ambient temperature), or hot air may be used in combination along with the use of a carbon heater which generates near-infrared to mid-infrared rays.

The drying temperature in each of the steps described above is preferably ambient temperature to 80° C. At 100° C. or higher, there is a risk of boiling of the solution, and if the temperature exceeds 80° C., there is a risk that the substrate will whiten or deform due to overheating.

A plastic bottle is produced by stretch blow-molding the preform according to the present invention. Thus, yet another embodiment of the present invention provides a plastic bottle obtained by blow-molding the preform for a plastic bottle according to the invention and a method for the production thereof.

EXAMPLES

Example 1: Suppression of Delamination by Anchor Coating Agent

The outer surfaces of preforms for a 500 ml PET bottle (24 g) were irradiated with plasma for approximately 3 seconds using an atmospheric plasma irradiation surface modifier (PS-1200AW, produced by Wedge, Co.), and thereafter were heated to 50° C. in an oven. Thereafter, the preforms were dipped once in the respective types of anchor coating agents and dried in a 50° C. oven for approximately 30 minutes to form an anchor layer. After drying, the preforms were dipped once into a 10% PVA solution while being maintained at 50° C. and were dried for 1 hour in a 50° C. oven. The PVA solution was prepared by charging PVA powder (Exeval™ HR-3010, produced by Kuraray, Co., Ltd.) into a beaker provided with a heating device and a stirrer, adding room temperature water thereto to achieve a concentration of 10 wt %, heating the mixture to a solution temperature of 95° C. while stirring, and continuing stirring until the PVA was completely dissolved. The steps of dipping into the above PVA solution and drying were repeated to form a barrier layer. After drying, the preform was dipped once into a PVB solution while being maintained at 50° C. and dried in a 50° C. oven for 30 minutes to form a protective layer. The PVB solution was produced by charging PVB powder (Mobitol™ B-30HH, produced by Kuraray, Co., Ltd.; glass transition temperature 63° C.) into a beaker provided with a heating device and a stirrer, adding ethanol (99.5%) thereto to achieve a concentration of 5 wt %, and while stirring at ambient temperature, continuing stirring until the PVB was completely dissolved. PET bottles were produced by stretch blow-molding, under conventional conditions, the preforms having a coating film on which each layer was formed with a stretch blow-molding machine. Citric acid and baking soda were added to the PET bottles, which were then filled with 4.2 GV of carbonated water. The PET bottles filled with the carbonated water were stored in a constant temperature room at 23° C. and 50% RH, and the presence or absence of delamination was confirmed.

Table 1 below shows the barrier material (PVA) applicability and delamination resistance when each anchor coating agent was used. As the anchor coating agent, in addition to W5030 and WS5000 described above, W6010, W6020, W6061, and WPB341, which are polyethylene-based urethane resins produced by Mitsui Chemical, Inc., Stipulli, which is a styrol-based resin produced by Osaka Printing Ink Mfg., Co., Ltd., AD373MW, which is a polyethyleneimine-based resin produced by Toyo Morton, Seikadyne, which is a polybutadiene-based resin produced by Dainichiseika Chemicals, Co., Ltd., and Z-565, Z-730, Z-687, Z-880, and RZ-105, which are polyethylene-based resins produced by Goo Chemical Co., Ltd., were used.

TABLE 1

| Anchor Coating Agent | Resin Type | Barrier Material (PVA) Applicability | Days to Delamination | Tg (° C.) |
|---|---|---|---|---|
| N/A | | | 3 Days | |
| PVB | Butyral | Good | 1 Month | 63 |
| W5030 | Urethane | Good | 6 Months | 85 |
| WS5000 | Urethane | Good | 1 Month or more | 65 |
| W6010 | Urethane | Poor | | 90 |
| W6020 | Urethane | Poor | | 90 |
| W6061 | Urethane | Good | | 21 |
| WPB341 | Urethane | Good | 1 Week | 115 |
| Stipulli | Styrol | | 1 Week | 30 |
| AD373MW | Polyethyleneimine | Good | 3 Days | — |
| Seikadyne | Polybutadiene | Good | 3 Days | — |
| Z-565 | Polyester | Good | 1 Month | 64 |
| Z-730 | Polyester | Poor | | 46 |
| Z-687 | Polyester | Good | 2 Weeks | 110 |
| Z-880 | Polyester | Good | 2 Weeks | 20 |
| RZ-105 | Polyester | Good | 1 Month | 62 |

It was confirmed that WS5000 and W5030, which are polyester-based urethane resins and which have a Tg of 65° C. to less than 90° C., had a delamination resistance of one month or more and could withstand practical use. Among them, it was confirmed that W5030 had a delamination resistance of 6 months and the coating agent did not peel after a long period of time.

The invention claimed is:

1. A preform for a plastic bottle comprising a mouth serving as an opening of the plastic bottle, a cylindrical body, and a bottom enclosing the cylindrical body,
wherein the preform has a coating film in which an anchor layer containing a polyester-based urethane resin is formed on an outer surface of the preform, and
wherein a barrier layer containing polyvinyl alcohol and a leveling agent is formed on the anchor layer.

2. The preform according to claim 1, wherein a protective layer containing polyvinyl butyral (PVB) is formed on the barrier layer.

3. The preform according to claim 1, wherein the polyester-based urethane resin has a glass transition temperature (Tg) of approximately 65° C. to less than approximately 90° C.

4. The preform according to claim 1, wherein the polyester-based urethane resin has a glass transition temperature (Tg) of approximately 80° C. to approximately 85° C.

5. A plastic bottle comprising a mouth serving as an opening of the plastic bottle, a cylindrical body, and a bottom enclosing the cylindrical body,
wherein the plastic bottle has a coating film in which an anchor layer containing a polyester-based urethane resin is formed on an outer surface of the preform, and
wherein a barrier layer containing polyvinyl alcohol and a leveling agent is formed on the anchor layer.

6. The plastic bottle according to claim 5, wherein a protective layer containing polyvinyl butyral (PVB) is formed on the barrier layer.

7. The plastic bottle according to claim 5, wherein the polyester-based urethane resin has a glass transition temperature (Tg) of approximately 65° C. to less than approximately 90° C.

8. The plastic bottle according to claim 5, wherein the polyester-based urethane resin has a glass transition temperature (Tg) of approximately 80° C. to approximately 85° C.

9. A method for the production of a preform for a plastic bottle, the method comprising the steps of:
preparing a preform comprising a mouth serving as an opening of the plastic bottle, a cylindrical body, and a bottom enclosing the cylindrical body, and
coating an outer surface of the preform with an anchor coating agent containing a polyester-based urethane resin and drying to form an anchor layer, and
coating the anchor layer with a solution containing polyvinyl alcohol and a leveling agent and drying to form a barrier layer.

10. The method according to claim 9, further comprising the step of coating the barrier layer with a polyvinyl butyral (PVB) solution and drying to form a protective layer.

11. The method according to claim 9, wherein the polyester-based urethane resin has a glass transition temperature (Tg) of approximately 65° C. to less than approximately 90° C.

12. The method according to claim 9, wherein the polyester-based urethane resin has a glass transition temperature (Tg) of approximately 80° C. to approximately 85° C.

13. A method for the production of a plastic bottle, comprising a step of blow-molding a preform for a plastic bottle produced by the method according to claim 9.

* * * * *